Patented July 21, 1925.

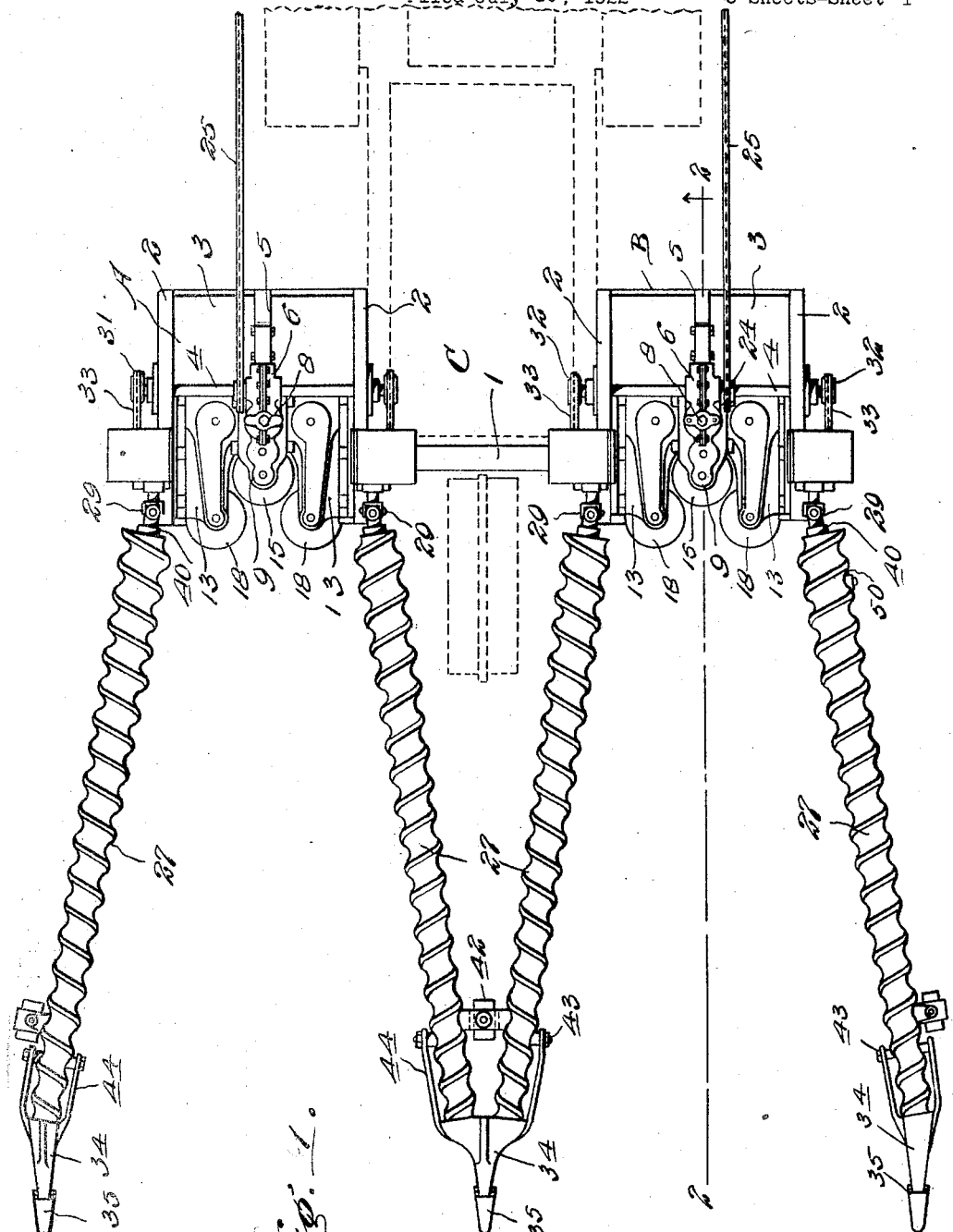

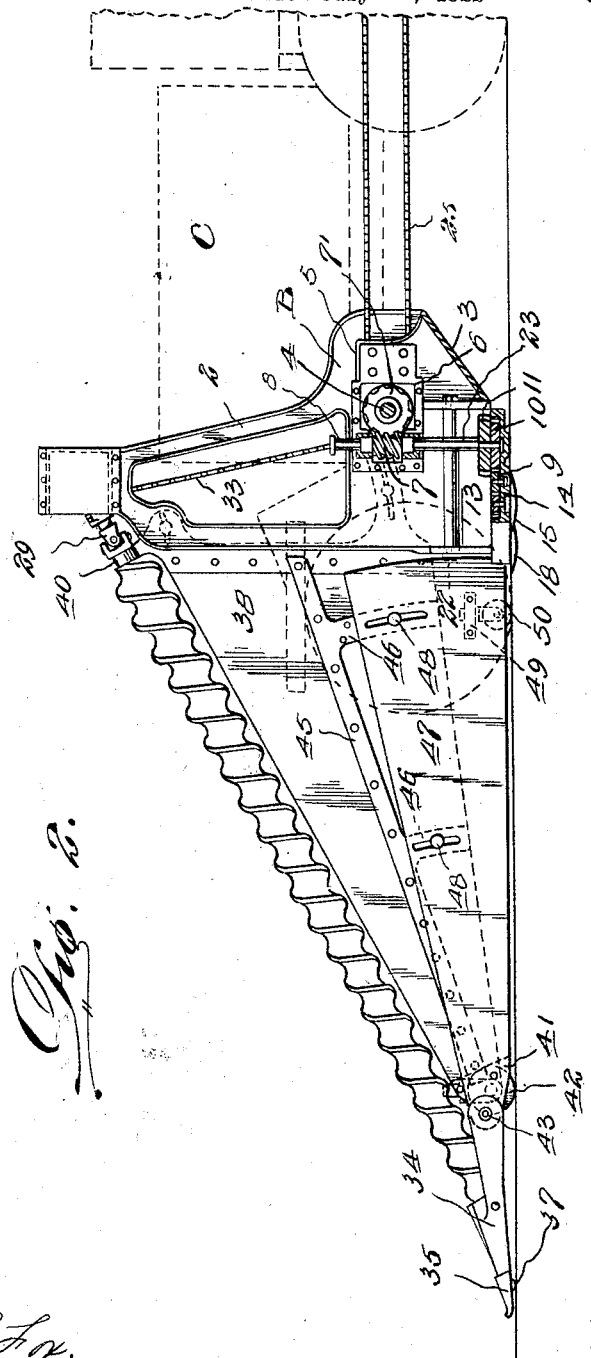

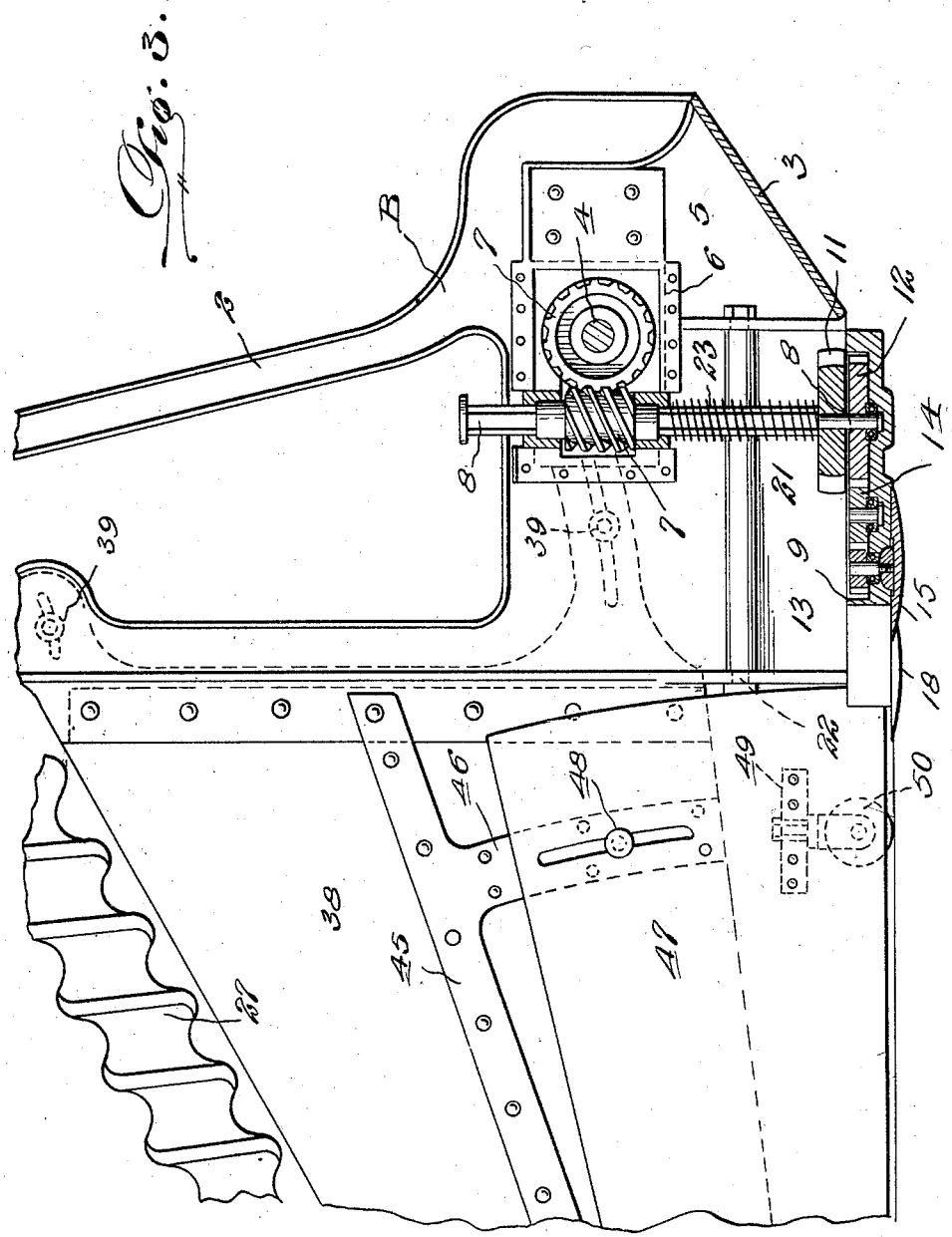

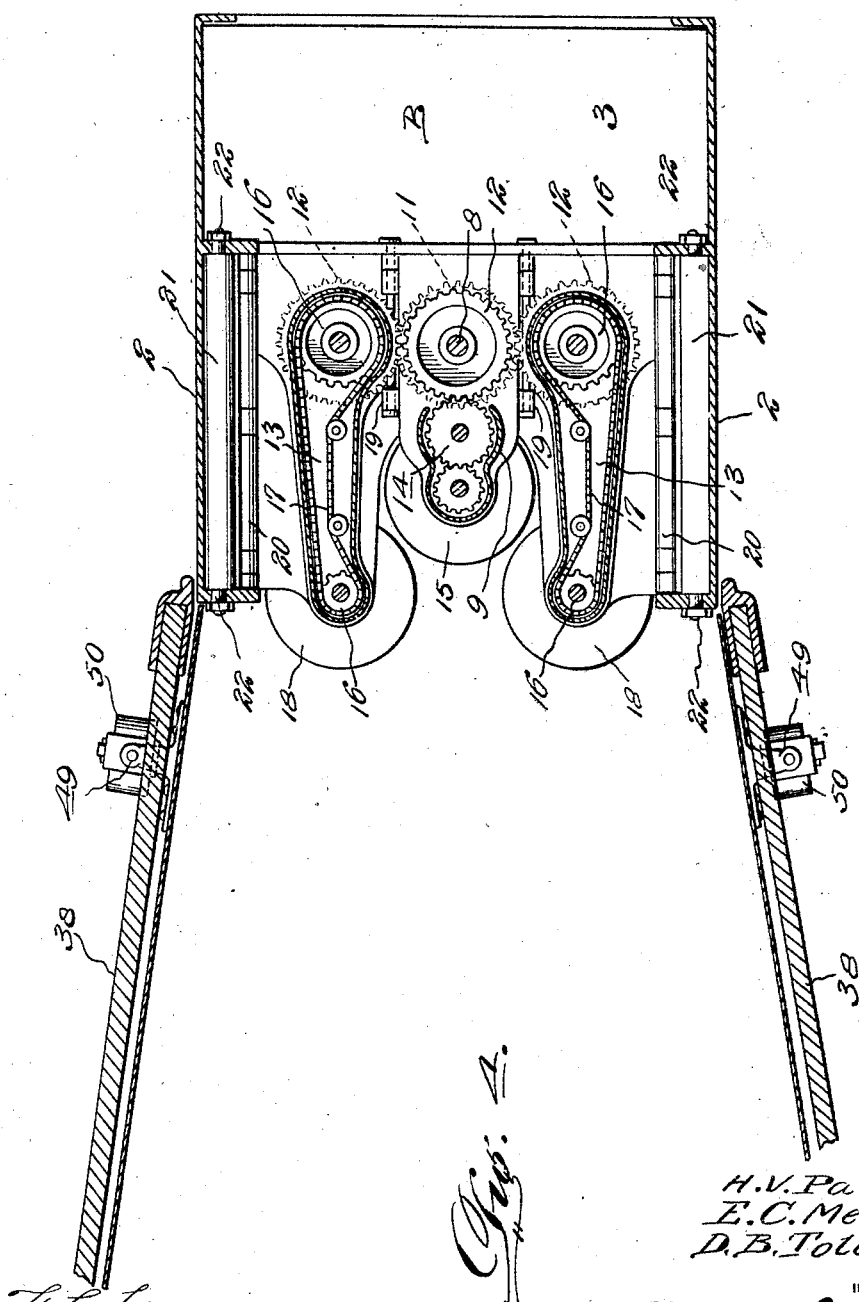

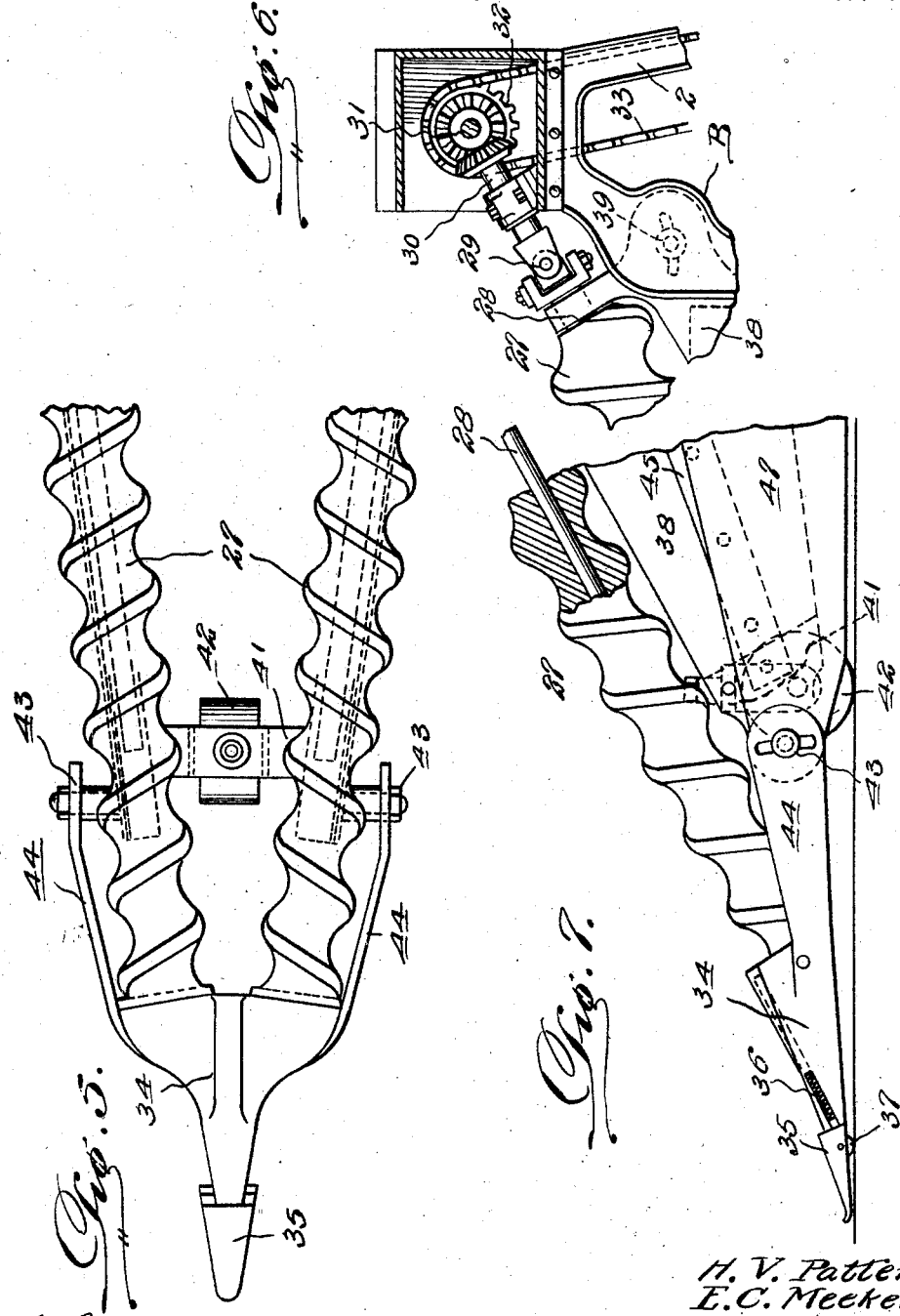

1,546,550

UNITED STATES PATENT OFFICE.

HAROLD V. PATTEN, ERNEST C. MEEKER, AND DIEGO BROTO TOLEDO, OF HILO, TERRITORY OF HAWAII.

CANE CUTTER.

Application filed July 10, 1922. Serial No. 573,855.

*To all whom it may concern:*

Be it known that we, HAROLD V. PATTEN, ERNEST C. MEEKER, and DIEGO BROTO TOLEDO, the two former citizens of the United States, and the latter a subject of the King of Spain, who filed his declaration of intention to become a citizen of the United States on June 1st, 1921, and all residing at Hilo, Territory of Hawaii, have invented new and useful Improvements in Cane Cutters, of which the following is a specification.

This invention relates to an apparatus for cutting cane and the like, the general object of the invention being to provide a number of screw shafts for bringing the cane against the knives so that all the cane in the row will be cut regardless of the position of the stalks in the row.

Another object of the invention is to provide a plurality of knives which are yieldingly held and which are flexibly connected with each other.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the invention showing the same being attached to a tractor.

Figure 2 is a section on line 2—2 of Figure 1.

The remaining figures are detail views.

In these views A and B indicate a pair of frames which are suitably attached to the front of the tractor C, the two frames being connected together by the bridge piece 1. Each frame consists of a pair of upright members 2, connected together by the rib 3, and the shaft 4 which is provided with flanged bearings. A centrally arranged vertical rib 5 is connected with the part 3 of each frame and this rib supports the castings 6 through which the shaft 4 passes and which forms a housing for the worm gears 7 and 7', one of which is located on shaft 4 and the other is slidably mounted on a vertically arranged shaft 8 which has its lower end journaled in the central knife casting 9 and to which is secured the knife gear 10 and the gear 11 which meshes with the gears 12 of the knife castings 13 which are located on each side of the casting 9. These castings are recessed to receive the knife parts and the central casting carries the gears 14 which mesh with each other and with the gears 10 and the front one of which has the disc knife 15 secured to its axle so that the knife will be rotated through the gears and shaft 8. Each of the side knife castings 13 carry the sprockets 16, the rear one of which is connected with the gear 12 and an endless chain 17 passes over these sprockets so that the movement of the rear sprocket will be communicated to the front sprocket. This front sprocket has secured to the lower end of its shaft a disc knife 18. The side castings are of greater length than the middle casting so that the side knives are arranged in advance of the middle knife, as shown in the plan view. The knives are beveled on the bottom sides from the center to the cutting edge so that they will have a tendency to ride on top of the ground instead of digging in. The center casting is hinged to the side castings by the hinges 19 and the side castings are connected by the hinges 20 with the side plates 21 which are pivotally connected with the uprights 2, as shown at 22. This arrangement of parts will permit the knives to rise and fall with the ground and the center knife is yieldingly held in contact with the ground by means of a spring 23 on shaft 8 which has its upper end bearing against the bottom of casting 6 and its lower end against the gear 11. We prefer to make the upper part of the shaft 8 of hexagon shape and this part of the shaft works in a similar shaped bore of the gear 7. The gears 11 and 12 are shaped as shown so that the gears will remain in mesh at any angle that the knife castings may take. This arrangement of the knives and their associated parts will permit the knives to cut the cane growing out of the tops and sides of the rows. Shafts 4 are driven from a part of the tractor by means of the sprockets 24 and the chains 25.

In order to bring the canes to the knives we provide a pair of screw shafts 27 for each set of knives. These shafts are each formed of a wooden screw having a shaft 28 passing through the same and the upper end of the shaft is connected by the universal coupling 29 with a shaft 30 which is geared to a shaft 31 which is connected by the sprocket 32 and chain 33 with the shaft 4. The lower end of each shaft 28 is rotatably supported in a shoe 34, the central shoe being formed double to receive the ends of the central pair of conveyors which are convergent from the frames A and B. A slipper 35 is slidably supported on the end of each shoe and is held in its projected position by a spring 36. Each slipper carries a roller 37 for engaging the ground. If this slipper should strike an obstruction the spring 36 will act as a shock absorber to prevent damage of the parts and will return the slipper to normal position after it has passed the obstruction. A vertically arranged plate 38 is arranged under each conveyor, said plate being of tapered formation and has its wide end connected with the frame 2 by the slot and pin connections 39. Each plate is also connected with the shaft 28 by the bearings 40. The outer end of each plate carries a casting 41 which supports a roller 42 and the pin 43, said pin passing through the arms 44 which are connected with the shoe. As shown the casting for wheel 42 of the inner pair of plates passes from one plate to the other so that the wheel is located between the two plates. The wheels on the outer device are located to the outer side of each plate. A reinforcing strip 45 is secured to the bottom of each plate and has a depending part 46 to which a bottom plate 47 is adjustably secured by the bolts 48. This bottom plate has its front end pivotally secured to the front casting 41 and has a bracket 49 adjacent its rear end which supports a roller 50, this roller engaging the ground. It will be seen that each plate 38 will move with the conveyor due to its slot and pin connection with the supporting frame so that the conveyor assembly can ride over the ground. The bottom plates 47 will remain close to the ground at all times so that all the canes will be forced against the knives. Our invention will cut the cane regardless of the angles the stalks grew in. It is a well known fact that the cane does not grow straight up but the stalks will extend at all angles in the row. Our conveyors will direct all the stalks against the knives and we may provide suitable conveyor means for receiving the cut canes from the knives. The arrangement of the conveyor parts will permit the device to be used on unlevel ground.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. An apparatus of the class described comprising a supporting frame, screw shaped conveying means extending downwardly and forwardly from the frame, cutting means supported by the frame, means for permitting the cutting means to conform to the ground over which they are passing, such means including spring means for pressing one of the cutting means against the ground.

2. An apparatus of the class described comprising a pair of supporting frames, a set of knives carried by each frame, a pair of longitudinally extending screw shaped conveyors supported by each frame, a shoe connected with the front end of the outer conveyor of each pair, a double shoe connected with the front ends of the inner conveyors of the pairs, rollers supporting the front ends of the conveyors, vertically arranged plates located below the conveyors and movably connected with the supporting frames, the lower part of each plate being movably supported on the upper part and a roller supporting the lower part.

In testimony whereof we affix our signatures.

HAROLD V. PATTEN.
ERNEST C. MEEKER.
DIEGO BROTO TOLEDO.